Feb. 19, 1952     C. E. ADAMS ET AL     2,585,983
ALKYLATION PROCESS
Filed Dec. 4, 1948
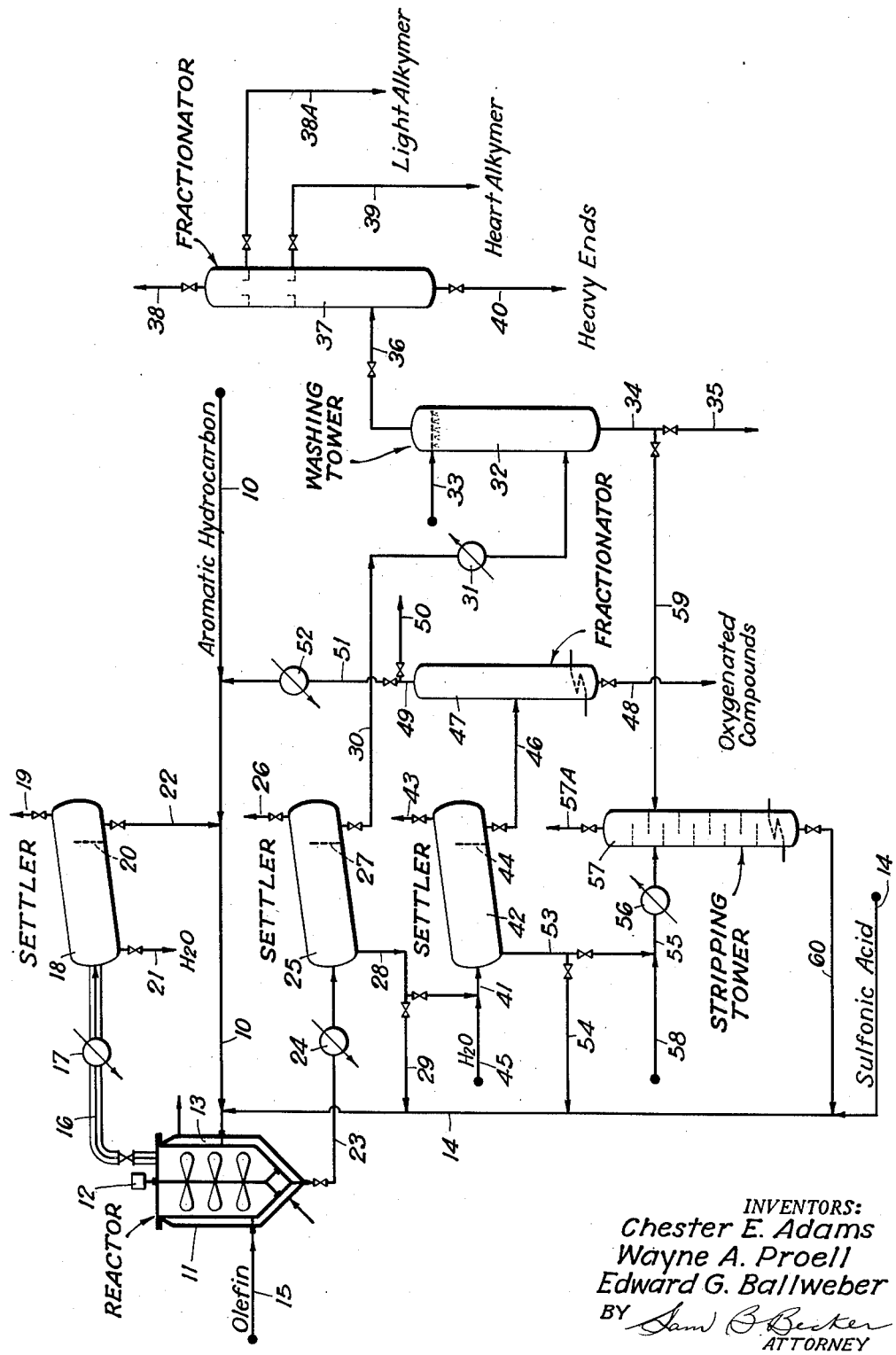
INVENTORS:
Chester E. Adams
Wayne A. Proell
Edward G. Ballweber
BY *Sam B Becker*
ATTORNEY Patented Feb. 19, 1952

2,585,983

UNITED STATES PATENT OFFICE 2,585,983

ALKYLATION PROCESS

Chester E. Adams, Highland, Ind., and Wayne A. Proell and Edward G. Ballweber, Chicago, Ill., assignors to Standard Oil Company, Chicago, Ill., a corporation of Indiana Application December 4, 1948, Serial No. 63,582

8 Claims. (Cl. 260—671)

This invention relates to a novel process for the alkylation of aromatic hydrocarbons wherein the alkylating agents are liquid olefinic hydrocarbon fractions derived from processes for the hydrogenation of carbon monoxide (so-called hydrocarbon synthesis or HCS) and wherein organic sulfonic acids are employed as alkylation catalysts.

Olefin fractions, including olefin polymers, which contain no oxygenated organic compounds (oxy compounds) can readily be employed to alkylate aromatic hydrocarbons in high yields in the presence of a wide variety of catalysts. Surprisingly, we have observed that certain oxy compounds in HCS olefin fractions exhibit substantial inhibiting or poisoning effects on conventional alkylation catalysts such as aluminum chloride, phosphoric acid and sulfuric acid and that the employment of HCS olefin fractions containing oxy compounds for the alkylation of aromatic hydrocarbons leads to low yields of alkymers and low alkylation reaction rates. Although we do not choose to be bound by any theory, our observations on the effects of HCS olefin fractions containing oxy compounds on conventional alkylation catalysts have led us to the belief that the poisoning effects are at least two-fold, viz., (1) water produced by the dehydration of some of the oxy compounds in the HCS olefin fraction dilutes the alkylation catalyst or reacts therewith, (2) oxy compounds containing the carbonyl group such as ketones, aldehydes, etc. exert a poisoning effect on conventional alkylation catalysts apparently by the formation of complex compounds therewith.

The crude HCS olefin fractions which we employ in our alkylation process are derived from processes in which carbon monoxide is reduced by hydrogen to produce a variety of gaseous, liquid and solid hydrocarbons in the presence of eighth group metal catalysts, particularly iron, cobalt and nickel catalysts. The synthesis gas, consisting essentially of a mixture of carbon monoxide and hydrogen, is produced by partial oxidation of natural gas or other hydrocarbon gas, suitable operating conditions being, for example, a temperature of about 2500° F. and a pressure of about 250 p. s. i. g. Synthesis gas may also be produced by conventional processes of reforming natural gas with steam in the presence of a catalyst; when desired, both the oxidation and reforming processes may be employed to generate synthesis gas. The $H_2 : CO$ ratio in the synthesis gas may be adjusted as desired, usually to a ratio between about 2:1 and about 5:1 in the reactor. A variety of iron-containing catalysts may be employed. The catalysts may be prepared by the reduction of fused iron oxides, mill scale, or pyrites-ash, and may be sintered before or after reduction to obtain improved activity and life. The iron catalysts are suitably promoted by small amounts of alkali metal components such as KOH, $H_2CO_3$, KF or the corresponding sodium compounds. A suitable catalyst, for example is the commercial ammonia synthesis catalyst frequently employed in the United States, known as the C. C. C. catalyst; essentially this catalyst is iron promoted by small amounts of alkali. Synthesis can be effected in reactors utilizing a fluidized iron catalyst bed at temperatures between about 450 and about 700° F. and pressures between about 200 and about 500 p. s. i. g.

Among the hydrocarbon products produced in the above-described synthesis operation are olefinic hydrocarbon fractions which contain paraffin hydrocarbons of approximately the same carbon number and boiling range and, in addition, a substantial amount of preferentially oil-soluble, neutral oxygen-containing organic compounds such as aldehydes, ketones, esters, acetals, ethers, alcohols and the like. We have observed that these olefinic hydrocarbon fractions, with which the preferentially oil-soluble oxygen-containing organic compounds are associated, contain, on the average, 7 and more carbon atoms per molecule of the hydrocarbons present. The oxygenated compounds present in the above-mentioned Synthol olefin hydrocarbon fractions cannot be removed to any satisfactory degree by simple washing with water, alkalies or specific group reagents, for example, aqueous sodium bisulfite for the removal of carbonyl compounds.

The proportion, and possibly to some extent the nature of the oxygenated compounds produced in the iron-catalyzed HCS process, will naturally depend upon and vary with the specific catalyst, catalyst age and operating conditions employed. Table 1 sets forth data concerning the composition of a typical iron-HCS olefin fraction. It can readily be calculated from the data in Table 1 that the oxy compounds concentration in the total olefin fraction was about 13.3 weight per cent.

TABLE 1

| Carbon Number | Wt. Per Cent of fraction | $n_D^{20}$ | Specific Gravity | Wt. Per Cent Oxygen | Total Oxy. Cpds. ($C_n$-2), Wt. Per Cent of Col. 2 | Hydroxyl Cpds. ($C_n$-3), Wt. Per Cent of Col. 2 | Carbonyl Cpds. ($C_n$-2), Wt. Per Cent of Col. 2 | Other Oxy. Cpds.+Error by Difference |
|---|---|---|---|---|---|---|---|---|
| 5 | 8.8 | | 0.655 | 1.0 | 3.6 | | 1.3 | 2.3 |
| 6 | 14.0 | 1.389 | 0.687 | 0.83 | 3.8 | 1.6 | 3.3 | −1.1 |
| 7 | 14.0 | 1.4087 | 0.726 | 2.10 | 11.3 | 3.9 | 4.7 | 2.7 |
| 8 | 13.7 | 1.4115 | 0.737 | 2.03 | 12.7 | | 6.0 | |
| 9 | 11.6 | 1.4230 | 0.764 | 1.97 | 14.0 | 9.3 | 6.5 | −1.8 |
| 10 | 9.7 | 1.4350 | 0.790 | 2.46 | 19.7 | 9.0 | 6.2 | 4.5 |
| 11 | 7.4 | 1.4430 | 0.804 | 2.73 | 24.2 | 12.0 | 6.2 | 6.0 |
| 12 | 4.7 | 1.4487 | 0.822 | 2.76 | 27.0 | 14.0 | 6.1 | 6.9 |
| 13 | 3.7 | 1.4540 | 0.831 | 2.58 | 27.4 | 15.0 | 5.7 | 6.7 |
| 14 | 2.6 | 1.4575 | 0.836 | 2.43 | 28.0 | | 6.1 | |
| 15 | 1.6 | 1.4613 | 0.842 | 2.3 | 28.4 | 18.0 | 5.9 | 4.5 |
| 16 | 1.1 | 1.4638 | 0.844 | 2.1 | 28.2 | 16.5 | 5.7 | 6.0 |
| 17 | 1.0 | 1.4660 | 0.848 | 2.5 | | | | |
| Residue | 6.3 | | | | | | | |

The olefinic hydrocarbon content of the normally liquid HCS olefin fractions often ranges between about 50 and about 75 percent by weight and the concentration of oxy compounds ranges from about 5 to about 30 weight percent.

Although, as we have pointed out above, crude HCS olefin fractions cannot be used for the alkylation of aromatic hydrocarbons in the presence of conventional catalysts, we have found that organic sulfonic acids can be employed as alkylation catalysts providing that water be removed from the alkylation zone during the course of the alkylation operation to maintain substantially anhydrous conditions in the alkylation zone. Also, if it is desired to maintain the activity of the sulfonic acid catalyst it is desirable, from time to time, to remove the oxy compounds which are dissolved by and accumulate in the catalyst phase. Since sulfonic acids function not merely as alkylation catalysts but also as selective solvents for oxy compounds in the process of this invention, the present process yields alkymers which are substantially free of oxy compounds.

The presence of oxygen-containing organic compounds in aromatic alkymers derived from HCS olefinic hydrocarbon fractions is highly undesirable. We have noted that some fractions of oxygenated organic compounds obtained from HCS olefins possess dark color. Sulfonation of the aromatic alkymers to produce detergents is usually conducted with concentrated or fuming sulfuric acid, in the course of which oxygen-containing organic compounds undergo resinification and darkening, resulting in the production of dark-colored, resin-containing sulfonic acids.

A wide variety of organic sulfonic acids may be employed as alkylation catalysts and solvent media in the process in the present invention. Thus, we may employ strongly acidic alkanesulfonic acids, particularly those having 1 to 5 carbon atoms, inclusive, in the molecule, and their mixtures, although we may employ higher alkanesulfonic acids. Aryl sulfonic acids such as benzenesulfonic, toluenesulfonic, xylenesulfonic, naphthalenesulfonic, phenolsulfonic, chlorobenzenesulfonic, t-butylbenzenesulfonic and the like may also be employed. Also employable in the process of the present invention are chloroalkanesulfonic acids, which are produced to some extent by the hydrolysis of the products of reaction of sulfur dioxide and chlorine with paraffin hydrocarbons having 3 or more carbon atoms and with cycloparaffin hydrocarbons. Ordinarily we prefer to employ a strongly acidic sulfonic acid which will be present largely or wholly as a liquid phase under the alkylation process conditions selected for a particular set of reactants. Particularly, we prefer to employ hydrocarbon sulfonic acids as catalysts and solvent media for the alkylation process here under consideration, such as $C_1$-$C_5$ alkanesulfonic acids. It is convenient to use normally liquid sulfonic acids or sulfonic acids having melting points below about 55° C. as alkylation catalysts. The employment of liquid or readily liquefiable sulfonic acids as catalysts greatly simplifies the separation procedure following the alkylation process as will be discussed in some detail hereinafter in connection with the accompanying figure. It should also be noted that the accumulation of oxy compounds in the sulfonic acid catalysts tends to cause considerable reductions in melting points.

As charging stocks to be alkylated, we may employ monocyclic aromatic hydrocarbons such as benzene, toluene, xylenes, n- and isopropylbenzenes, m- or p-cymene, ethylbenzene, ethyltoluene, pseudocumene, butylbenzenes, amylbenzenes, cyclohexylbenzene and the like. We may also employ polycyclic aromatic hydrocarbons as the charging stock to be alkylated, for example naphthalene, methylnaphthalenes, dimethylnaphthalenes, amylnaphthalenes, anthracene, diphenyl and the like.

A particularly desirable application of the process of our invention is to the preparation of alkymers which yield high quality detergents upon sulfonation and neutralization, i. e., so-called detergent alkymers. To this end, the preferred charging stocks are monocyclic aromatic hydrocarbons containing 6 to 10 carbon atoms, inclusive, in the molecule and iron-catalyst HCS olefin fractions containing one or a mixture of mono-olefins having between 7 and about 15 carbon atoms, preferably 10 to 15 carbon atoms, inclusive, in the molecule.

While the preparation of detergent alkyl aromatic hydrocarbons represents a highly desirable commercial application of the process of our invention, it will be understood that our invention is capable of numerous other applications. Thus alkylation of aromatic hydrocarbons with higher mono-olefins, e. g. containing 20–30 or even more carbon atoms in the molecule yields alkymers which upon sulfonation form preferentially oil-soluble acids and sulfonates, i. e. syntheic mahogany soaps.

Our alkylation process features the removal, preferably continuously, of water formed or otherwise present in the alkylation reaction zone. Although chemical methods of sequestering water in the alkylation zone are theoretically, at least, available, we prefer to remove water physically from the alkylation reaction zone since the addition of chemical water-combining reagents is usually accompanied by more or less deleterious effects upon the catalyst and moreover it introduces great complications in the separation of the alkylation reaction mixture. We prefer to remove water from the alkylation reaction zone at substantially the rate at which it is formed, but it is possible to effect a somewhat lower rate of water removal from the alkylation reaction zone without foregoing entirely the advantages of increased reaction rate and higher yield of alkymer. We prefer to effect removal of water at a rate such that the amount of water present in the alkylation reaction zone at any one time does not exceed about 5 weight percent present based upon the sulfonic acid catalyst employed.

It is desirable to remove water from the alkylation reaction zone as a minimum boiling azeotrope. Water forms minimum boiling azeotropes with low boiling monocyclic aromatic hydrocarbons such as benzene and toluene. Thus, by using an excess of the monocyclic aromatic hydrocarbon to be alkylated and by effecting the alkylation reaction by refluxing the reaction mixture, it is possible to distil overhead from the reaction mixture an aromatic hydrocarbon-water minimum boiling azeotrope which may be condensed outside the reaction zone to form a lower water layer and an upper aromatic hydrocarbon layer which may be recycled to the alkylation reaction zone to aid in carrying off further quantities of water therefrom.

It may also be desirable to add materials to the alkylation reaction zone which form minimum boiling azeotropes with water and which are chemically inert under the alkylation reaction conditions. Suitable materials include ethyl acetate, methyl ethyl ketone, chloroform, cyclohexane or the like. Because of its obvious simplicity and economy we prefer that method of water removal from the alkylation zone which entails the use of an excess of the alkylatable hydrocarbon which forms a minimum boiling azeotrope with water.

When the reactants in the alkylation zone boil at a sufficiently high temperature and do not form minimum boiling azeotropes with water, it is possible to distil water directly from the alkylation reaction zone by maintaining a sufficiently high temperature therein and, if desired, blowing inert gases such as nitrogen, methane or $CO_2$ therethrough.

In order to illustrate but not unnecessarily to limit the scope of our invention, a number of examples thereof are tabulated below (Table 2).

TABLE 2

| Run No. | 1 | 2 | 3 | 4 | 5 | 6 | 7 | 8 |
|---|---|---|---|---|---|---|---|---|
| HCS Olefin: | | | | | | | | |
| Carbon No. | 12 | 12 | 12 | 12 | 12 | 12 | 12 | 12 |
| Boiling Range, °F (10 and 90% A. S. T. M.) | 406–412 | 391–397 | 391–397 | 391–397 | 391–397 | 391–397 | 406–414 | 406–414 |
| Catalyst | (1) | $EtSO_3H$ | $EtSO_3H$ | $EtSO_3H$ | $EtSO_3H$ | $EtSO_3H$ | $EtSO_3H$ | $EtSO_3H$ |
| Charge, w. per cent on HCS fraction: | | | | | | | | |
| HCS fraction | 100 | 100 | 100 | 100 | 100 | 100 | 100 | 100 |
| Aromatic H. C. (2) | T220 | T223 | T223 | T223 | T223 | T223 | T223 | T223 |
| Catalyst | 55 | 16 | 32 | [5] 32 | [6] 37 | 64 | 65 | 327 |
| Total | 375 | 339 | 355 | 355 | 360 | 387 | 388 | 650 |
| Operating Conditions: | | | | | | | | |
| $H_2O$ Trap-out | No | Yes | Yes | Yes | Yes | Yes | Yes | Yes |
| Temp., °F | 75 | 230–241 | 230–241 | 230–241 | 230–241 | 230–241 | 230–241 | 230–241 |
| Time, Hours | 1.25 | [3] 5 | [3] 5 | [3] 5 | [3] 5 | [3] 5 | [3] 5 | [3] 5 |
| Reaction Rate, w. per cent Olefin Disappearance after: | | | | | | | | |
| 1 hour | | 8 | 47 | 28 | 50 | 83 | 97 | |
| 5 hours | | 19 | 81 | 69 | 81 | 89 | 97 | 84 |
| Recovery, w. per cent on HCS fraction: | | | | | | | | |
| Catalyst Layer | | 13 | 32 | 24 | 34 | 71 | 70 | 352 |
| W. per cent dissolved materials | | | | | | | | |
| Oil Layer: | | | | | | | | |
| Acid | | 2 | 5 | 3 | 3 | 3 | | |
| Aromatic H. C. (Unreacted) | | 208 | 183 | 186 | 150 | 178 | 156 | 83 |
| Light Alkymer | 78 | 60 | 33 | 39 | 37 | 34 | 25 | 25 |
| Heart Alkymer | 19 | 22 | 63 | 53 | 41 | 69 | 93 | 85 |
| Heavy Alkymer | 10 | 15 | 24 | 24 | 40 | 20 | 28 | 23 |
| Total | 107 | 320 | 340 | 329 | 305 | 375 | 372 | 568 |
| Heart Alkymer, per cent of theor. | [4] 18 | [4] 25 | [4] 71 | [4] 60 | [4] 46 | [4] 78 | [7] 90 | [7] 82 |
| Per cent $H_2O$ in Catalyst: | | | | | | | | |
| Before Reaction | | 0 | 0 | 0 | 0 | 0 | 0 | 0 |
| After Reaction | | 0 | 0 | 0 | 0 | 0 | 0 | 0 |

| Run No. | 9 | 10 | 11 | 12 | 13 | 14 | 15 | 16 |
|---|---|---|---|---|---|---|---|---|
| HCS Olefin: | | | | | | | | |
| Carbon No. | 12 | 12 | 12 | 12 | 12 | 12 | 12 | 12 |
| Boiling Range, °F (10 and 90% A. S. T. M.) | 391–397 | 406–414 | 391–397 | 391–397 | 391–397 | 391–397 | 391–397 | 391–397 |
| Catalyst | $EtSO_3H$ | $EtSO_3H$ | $EtSO_3H$ | $EtSO_3H$ | $EtSO_3H$ | $EtSO_3H$ | $EtSO_3H$ | $EtSO_3H$ |
| Charge, w. per cent on HCS fraction: | | | | | | | | |
| HCS fraction | 100 | 100 | 100 | 100 | 100 | 100 | 100 | 100 |
| Aromatic H. C. (2) | T223 | T223 | T223 | T223 | T223 | T223 | T223 | T223 |
| Catalyst | 32 | [8] 33 | 65 | 64 | [9] 69 | [10] 63 | [11] 57 | [12] 74 |
| Total | 355 | 356 | 388 | 387 | 392 | 386 | 380 | 397 |
| Operating Conditions: | | | | | | | | |
| $H_2O$ Trap-out | No | No | No | Yes | Yes | Yes | Yes | Yes |
| Temp., °F | 230–241 | 230–241 | 230–241 | 230–241 | 230–241 | 230–241 | 230–241 | 230–241 |
| Time, Hours | [3] 5 | [3] 5 | 5 | 5 | 5 | 5 | 5 | 5 |
| Reaction Rate, w. per cent Olefin Disappearance after: | | | | | | | | |
| 1 hour | 58 | 22 | 65 | 81 | 79 | 74 | 74 | 71 |
| 5 hours | 81 | 47 | 89 | 90 | 90 | 88 | 86 | 82 |
| Recovery, w. per cent on HCS fraction: | | | | | | | | |
| Catalyst Layer | 33 | 24 | 68 | 70 | 64 | 58 | 49 | 80 |
| W. per cent dissolved materials | | | | 15.7 | 22 | 20.6 | 22.4 | 27.5 |

See footnotes at end of table.

TABLE 2—Continued

| Run No | 9 | 10 | 11 | 12 | 13 | 14 | 15 | 16 |
|---|---|---|---|---|---|---|---|---|
| Oil Layer: | | | | | | | | |
|   Acid | 3 | 4 | | 5 | 5 | 4 | 5 | 4 |
|   Aromatic H. C. (Unreacted) | 190 | 197 | 163 | | | 191 | 186 | 173 |
|   Light Alkymer | 34 | 55 | 33 | | | 34 | 34 | 32 |
|   Heart Alkymer | 56 | 29 | 76 | | | 67 | 62 | 62 |
|   Heavy Alkymer | 28 | 22 | 23 | | | 22 | 26 | 24 |
| Total | 344 | 331 | 363 | | | 376 | 362 | 375 |
| Heart Alkymer, per cent of theor | [4] 63 | [7] 33 | [4] 73 | | | [4] 76 | [4] 70 | [4] 70 |
| Per cent H$_2$O in Catalyst: | | | | | | | | |
|   Before Reaction | 0 | 4 | 2 | | | | | |
|   After Reaction | 4 | 8 | 4 | | | | | |

| Run No | 17 | 18 | 19 | 20 | 21 | 22 | 23 | 24 |
|---|---|---|---|---|---|---|---|---|
| HCS Olefin: | | | | | | | | |
|   Carbon No | 12 | 11–13 | 14–15 | 11–13 | 14–15 | 13 | 13 | 12 |
|   Boiling Range, °F | 391–397 | [19] 109–194 | [19] 194–252 | [19] 109–194 | [19] 194–252 | [19] 180–187 | [19] 180–187 | 391–397 |
|   (10 and 90% A. S. T. M.) | | | | | | | | |
| Catalyst | EtSO$_3$H | EtSO$_3$H | EtSO$_3$H | EtSO$_3$H | EtSO$_3$H | EtSO$_3$H | EtSO$_3$H | ([20]) |
| Charge, w. per cent on HCS fraction: | | | | | | | | |
|   HCS fraction | 100 | 100 | 100 | 100 | 100 | [18] 100 | [18] 100 | 100 |
|   Aromatic H. C. ([2]) | T223 | T219 | T211 | B413 | B397 | B30 | B30 | T223 |
|   Catalyst | [13] 54 | 76 | 73 | 421 | 404 | 16 | 16 | 51 |
| Total | 377 | 395 | 384 | 934 | 901 | 146 | 146 | 374 |
| Operating Conditions: | | | | | | | | |
|   H$_2$O Trap-out | Yes | Yes | Yes | Yes | Yes | Yes | Yes | Yes |
|   Temp., °F | 230–241 | 239 | 239 | 185 | 185 | 240 | 240 | 230–241 |
|   Time, Hours | 5 | 5 | 5 | 5 | 5 | 5.5 | 8 | 5 |
| Reaction Rate, w. per cent Olefin Disappearance after: | | | | | | | | |
|   1 hour | 78 | | | | | | | 75 |
|   5 hours | 87 | 89 | 80 | 78 | 74 | 82 | | 89 |
| Recovery, w. per cent on HCS fraction: | | | | | | | | |
|   Catalyst Layer | 63 | 71 | 71 | 574 | 565 | 21 | 20 | 51 |
|   W. per cent dissolved materials | 19.1 | | | | | | 4 | |
| Oil Layer: | | | | | | | | |
|   Acid | 4 | | | | | | | |
|   Aromatic H. C. (Unreacted) | 169 | 187 | 180 | 241 | 216 | | | 176 |
|   Light Alkymer | 33 | 25 | 34 | 25 | 29 | | | 26 |
|   Heart Alkymer | 63 | 81 | 50 | 58 | 35 | | | 78 |
|   Heavy Alkymer | 25 | 19 | 35 | 19 | 30 | | | 22 |
| Total | 357 | [14] 383 | [14] 372 | 917 | 875 | | | 353 |
| Heart Alkymer, per cent of theor | [4] 71 | [15] 70 | [16] 54 | [15] 53 | [16] 40 | [17] 58 | [17] 66 | [4] 87 |
| Per cent H$_2$O in Catalyst: | | | | | | | | |
|   Before Reaction | | | | | | | | |
|   After Reaction | | | | | | | | |

[1] 95% H$_2$SO$_4$.
[2] T=toluene; B=benzene.
[3] Exclusive of 0.5 hour allowed for addition of olefin to mixture of aromatic and catalysts.
[4] Based on 57% olefin in HCS olefin fraction charged.
[5] Recovered catalyst from Run 3 (27 w. per cent acid).
[6] Recovered catalyst from Run 4 (28 w. per cent acid) plus 13 w. per cent fresh acid catalyst.
[7] Based on 67% olefin in HCS olefin fraction charged.
[8] Recovered catalyst from Run 9 (29 w. per cent acid).
[9] Recovered catalyst from Run 12; catalyst comprised 16 w. per cent dissolved oxys and aromatic hydrocarbons.
[10] Recovered catalyst from Run 13; catalyst comprised 22 w. per cent dissolved oxys and aromatic hydrocarbons.
[11] Recovered catalyst from Run 14; catalyst comprised 21 w. per cent dissolved oxys and aromatic hydrocarbons.
[12] Catalyst pretreated with HCS olefin equivalent to 12 runs.
[13] Regenerated catalyst from Run 16.
[14] In addition, 2 w. per cent water, based on HCS fraction was recovered from the water trap.
[15] Based on 73.5% olefin in HCS olefin fraction charged and average m. w. of 154.
[16] Based on 64% olefin in HCS olefin fraction charged and average m. w. of 202.
[17] Based on 70% olefin in HCS olefin fraction charged.
[18] SO$_2$ was blown through the HCS olefin fraction charged.
[19] Boiling point under a pressure of 5 mm. of mercury.
[20] Toluene sulfonic acid.

The procedure employed in carrying out the examples was to mix the aromatic hydrocarbon and sulfonic acid catalyst and to carry out the alkylation reaction by agitating and refluxing the mixture while adding the HCS olefin fraction gradually thereto. Usually the olefin fraction was added over the course of one-half to one hour and refluxing and agitation was thereafter continued for about 5 hours. In the examples in which a water trap was used, an azeotrope of water and aromatic hydrocarbon was distilled continuously from the reaction mixture, condensed and sent to a trap or separating vessel, whence water was discharged from the reaction system and the aromatic hydrocarbon upper layer was recycled to the reaction zone. In the examples in which no water trap was employed, the entire vapor stream evolved from the reaction mixture was condensed and recycled to the reaction zone so that the water produced by dehydration reactions in the reaction zone remained in the reaction mixture. The rate of olefin disappearance from the reaction mixture was followed by determining bromine titer.

Upon completion of the desired reaction period, the reaction mixture was allowed to cool, whereupon it was separated into two distinct liquid phases, viz., a lower predominantly sulfonic acid layer containing oxy compounds, dissolved aromatic hydrocarbons and, in some instances, water; a liquid layer comprising predominantly alkymer produced in the alkylation reaction and containing some dissolved sulfonic acid catalyst. The alkymer layer was neutralized by washing with alkali and was then water washed and fractionally distilled in a highly efficient fractionating column. The heart alkymer fraction consisted of the aromatic hydrocarbon containing an alkyl group having the same carbon number as the olefin charged to the alkylation process. The heavy alkymer fraction contained polyalkylated aromatic hydrocarbons and some high boiling olefin polymers. The so-called light alkymer fraction usually contained only non-olefinic hydrocarbons which were present in the HCS olefin fraction charged to the reactor.

The aromatic hydrocarbons employed as charging stocks in the examples were nitration grade toluene and 1° benzene. Both the HCS olefin fractions and aromatic hydrocarbons employed as charging stocks were redistilled before use. The catalyst used was anhydrous except as otherwise noted and was prepared by refluxing and agitating catalyst containing a small amount of water with toluene, using a condensate trap for the removal of water. The ethanesulfonic acid catalyst used in Examples 2 to 21, inclusive, had the following analysis before dehydration with toluene:

|  | Per cent |
|---|---|
| Sulfonic acid | 96.6 |
| Sulfuric acid | 1.0 |
| Water | 2.2 |
| Ash | 0.05 |

The ethanesulfonic acid catalyst employed in Examples 22 and 23 contained 99 percent ethanesulfonic acid.

Referring to Example 1 of Table 2, it will be noted that the employment of concentrated sulfuric acid led to a low yield of heart alkymer. This example typifies the results obtained by the use of sulfuric acid as a catalyst in the alkylation of aromatics with HCS olefin fractions containing oxy compounds.

In Example 2, in which ethanesulfonic acid was employed as the catalyst, a low reaction rate and low yield of heart alkymer were obtained because of the low concentration of catalyst, viz. 16 weight percent based on the HCS olefin fraction. It was observed in this example that the reaction mixture was a homogeneous solution, whereas in succeeding examples wherein 32 weight percent of even more ethanesulfonic acid was employed for the alkylation of toluene, the reaction mixture contained two distinct liquid phases. It appears from a comparison of Example 2 with Example 3 and others in which a greater catalyst concentration was employed, that it is desirable that the catalyst should be present in a concentration at least sufficient to exceed its solubility in the hydrocarbon charging stocks and reaction products, so as to form a distinct liquid catalyst phase in the reaction zone.

The solubility of benzene and toluene in ethanesulfonic acid of the following composition have been determined at about room temperature (20° C.).

Table

| Component | Composition, Weight Per Cent |
|---|---|
| Sulfonic acid | 95 |
| Water | 2 |
| Sulfuric acid | 1 |
| Ash | 0.02 |

The solubility of benzene in the above acid was 40 volume percent and the solubility of the acid in benzene was 9.6 volume percent. The solubility of toluene in the above acid was 21.4 volume percent and the solubility of the acid in toluene was 3.9 volume percent. Obviously, at higher temperatures the solubilities are increased.

In Example 3 wherein 32 weight percent of sulfonic acid based on the olefin fraction was employed and in which water was continuously trapped out of the vapors rising from the refluxing reaction mixture, both a high reaction rate and a high yield of desired alkymer were obtained. In Example 4 the catalyst layer separated from Example 3 was employed with fresh charge of reactants. Due to the loss of catalyst by solution in the hydrocarbon phase in Example 3, the actual concentration of catalyst in Example 4 was 27 weight percent based on HCS olefin fraction. With the reduction in the amount of catalyst, the rate and yield were somewhat reduced in Example 4 as compared with Example 3. In Example 5 the catalyst used was that recovered from Example 4 fortified with fresh ethanesulfonic acid. However, a rather low yield of heart alkymer was obtained, possibly due to the increased concentration of oxy compounds which were dissolved in the catalyst layer in the course of the three examples.

Examples 6, 7 and 8 indicate that very high yields of heart alkymer and high reaction rates are obtainable by the employment of a relatively large proportion of catalyst. In Example 8 the employment of a very large excess of catalyst (327 weight percent based on olefin) offered no improvement over the employment of 65 weight percent of catalyst (Example 7), which appeared to be about the optimum in that reaction system.

The importance of removing water from the reaction zone during the course of the alkylation will be apparent from a comparison of Examples 9, 10 and 11, wherein water was not trapped or otherwise removed from the reaction mixture, with the other examples in which water trap-out was employed. It will be noted from a comparison of Example 9 with Example 3 that the accumulation of as much as 4 weight percent of water in the catalyst caused a significant reduction in the yield of heart alkymer. A comparison of Example 11 with Example 7 illustrates this same point. When the concentration of water in the catalyst was allowed to rise above 4 or 5 percent, the reductions in reaction rate and yield of heart alkymer became severe, as shown in Example 10.

Examples 12 to 17, inclusive, illustrate life studies of the sulfonic acid alkylation catalyst. In Examples 12 to 15, inclusive, a given amount of fresh catalyst was used in an alkylation reaction and the recovered catalyst was recycled in subsequent alkylation reactions until some appreciable decrease in yield, which was not a consequence of loss of catalyst by dissolution in hydrocarbons, became apparent. In Examples 12 to 15, because of loss of catalyst to the hydrocarbon oil phase it was not possible to determine the effect of a large amount of oxy compounds in the catalyst phase by extended reuse of the catalyst with periodic fortification with fresh catalyst. In Examples 16 and 17, the catalyst was intimately contacted with a large amount of an HCS olefin fraction to extract oxy compounds therefrom and the catalyst thus treated was employed for alkylation. The purpose of Examples 16 and 17 was to obtain an approximation of the effect of a large quantity of oxy compounds in the catalyst phase on the catalyst efficiency.

The yield of heart alkymer in Examples 12 to 15 began to drop appreciably in the fourth reaction (Example 15). Yields of light alkymer remained reasonably constant throughout Examples 12 to 15, due to the complete conversion of olefin, while the yield of heavy alkymer was increasing rapidly in the fourth reaction (Example 15). The observed decrease in yield was not due to reduction in the quantity of sulfonic acid catalyst as will be aparent from a comparison of Example 15 with Examples 3 and 4 and must, therefore, be attributed to the increasing concentration of oxy compounds in the catalyst phase. It will be noted that the concentration of dissolved materials in the catalyst phase increased from 15.7 weight percent in Example 12 to 22.4 weight percent in Example 15.

To prepare the catalyst employed in Example 16, a two phase mixture of 130 g. of ethanesulfonic acid, 1560 g. of the HCS olefin fraction (10 times the amount generally employed in the examples) and 684 g. of n-heptane was heated at 240° F. and stirred for 5 hours, using a trap to remove water from the vapors evolved from the mixture. Heptane was incorporated in the catalyst preparation mixture to remove water as a minimum boiling azeotrope. The mixture was then allowed to settle and cool to room temperature, the liquid catalyst layer was separated and again treated by the above procedure. The total water recovered from both treatements of the catalyst was 31 ml.

The yield of heart alkymer in Example 16 was 70 percent of theoretical although the catalyst employed contained oxy compounds in a concentration calculated to be equivalent to the concentration expected after the employement of the catalyst in twelve alkylation reactions. The yield of heart alkymer in Example 16 was the same as that which was obtained after four recycle alkylations, as will be noted by comparison with Example 15. It is desirable, therefore, to employ a sulfonic acid catalyst having a relatively small concentration of dissolved oxy compounds, preferably not more than about 20 weight percent.

The used catalyst derived from Example 16 was heated to 280° F. to destroy oxy compounds. It proved to be impossible to remove water from the catalyst and the attempted regeneration was therefore considered unsuccessful.

In a further study of the regeneration of the used catalyst derived from Example 16 it was found that the addition of water in amounts of 5, 10 and 15 percent by volume effected only partial separation of an aqueous catalyst phase from an oil phase. With the addition of 50 volume percent of water to the catalyst derived from Example 16 it was found possible to separate an aqueous acid phase from an insoluble oil. The aqueous acid phase was then dehydrated by azeotropic distillation of water therefrom with toluene. The catalyst thus prepared was employed in Example 17. The insoluble oil derived by the addition of water to the catalyst phase was washed with water and heated for one hour at 212° F. under a pressure of 2 mm. of mercury; no appreciable amount of distillate was produced. The insoluble oil was viscous and opaque and had the following properties $n_D^{20}$ _____ 1.50
Sp. gravity _____ 0.93
M. W. (Menzies) _____ 610
Carbonyl number _____ [1] 1.2
Percent oxygen _____ [2,3] 5

[1] Theoretical = 18.6.
[2] Theoretical, assuming one atom of oxygen per mole = 2.6%.
[3] The analysis was carried out under conditions where the results may be expected to be high.

It will be noted from a comparison of Example 17 with Example 16 that the yield of heart alkymer was maintained with the use of the regenerated catalyst.

Examples 18 and 19 are illustrative of the alkylation of toluene with $C_{11}$–$C_{13}$ and $C_{14}$–$C_{18}$ HCS olefin fractions containing oxy compounds.

Examples 20 and 21 are concerned with the alkylation of benzene with HCS olefin fractions. Although the usual reflux temperature in the alkylation of toluene was about 240° F., the temperature of the refluxing reaction mixture in Examples 20 and 21 was only about 185° F. because of the high concentration of benzene in the reaction mixture. Because of the relatively low reaction temperature and the incomplete water removal due to the low temperature, the yields of heart alkymer were undesirably low.

By reducing the concentration of benzene in the reaction mixture, as in Examples 22 and 23, the reflux temperature of the reaction mixture was raised from about 185° F. to about 240° F. thereby greatly increasing the reaction rate and yields of heart alkymer. It will be noted that high yields of heart alkymer were obtained in Examples 22 and 23 even though only 16 weight percent of ethanesulfonic acid, based on HCS olefin, was used. It appears that the alkylation reaction proceeds rapidly in the presence of even a small amount of catalyst, provided that the catalyst is present in the reaction zone as a distinct liquid phase. With a reduced proportion of aromatic hydrocarbon present in the reaction mixture, a correspondingly reduced amount of catalyst can be used, since aromatic hydrocarbons are good solvents for the sulfonic acid catalyst. In comparing Example 2 with Examples 22 and 23, it will be noted that the high concentration of aromatic hydrocarbon in the charging stock in Example 2 resulted in the formation of a homogeneous reaction solution and a poor yield of heart alkymer.

Although it would be expected that reducing the mol ratio of aromatic to olefin from 4, as in previous examples, to 1 as in Examples 22 and 23 would greatly increase the extent of dialkylation, this was not found to be the case. Although Examples 22 and 23 relate to aromatic : olefin mol ratios of 1, we may use ratios between about 0.7 and about 1.5.

Contacting the HCS olefin fraction with $SO_2$ gas, suitably by blowing the liquid olefin fraction with $SO_2$ gas, reduces emulsion formation and increases the yield of alkymer in the subsequent alkylation of aromatics with the HCS olefin fraction. The olefin fractions in Examples 22 and 23 were thus treated.

Run 24 indicates that toluenesulfonic acid, which is a typical aromatic sulfonic acid and is available commercially, can be successfully employed under much the same operating conditions as were used with alkanesulfonic acids.

In Table 3 are presented some physical constants of detergent alkymers which were produced by the process of our invention.

TABLE 3

*Physical constants of the $C_{11-15}$ HCS olefin toluene and benzene alkymers*

|  | Boiling range (° C./5 mm. of Hg) | $n_D^{20}$ | Density (25° C.) |
|---|---|---|---|
| Toluene alkymers: | | | |
| $C_{11}$ | 120 –147.5 | 1.4912 | 0.895 |
| $C_{12}$ | 147.5–162.5 | 1.4915 | 0.882 |
| $C_{13}$ | 162.5–175 | 1.4940 | 0.899 |
| $C_{14}$ | 175 –185 | 1.4908 | 0.886 |
| $C_{15}$ | 185 –195 | 1.4921 | 0.895 |
| Benzene alkymers: | | | |
| $C_{11}$ | 115 –135 | 1.4863 | 0.873 |
| $C_{12}$ | 135 –150 | 1.4871 | 0.878 |
| $C_{13}$ | 150 –165 | 1.4926 | 0.890 |
| $C_{14}$ | 165 –175 | 1.4875 | 0.894 |
| $C_{15}$ | 175 –185 | 1.4848 | 0.883 |

Although certain illustrative embodiments of our invention are represented by the above examples, it should be understood that our invention is capable of considerable variation. Thus we may employ alkylation temperatures between about 230 and about 300° F., preferably about 240 to 260° F., aromatic : olefin mol ratios between about 0.7 and about 10, and an amount of liquid sulfonic acid catalyst sufficient to form a distinct liquid phase under the alkylation reaction conditions. Sufficient time is provided to effect substantial reaction, usually between about one-half to about 8 hours, preferably about 1 to about 5 hours. Important features of the process of this invention are the maintenance of the substantially anhydrous conditions in the reaction zone by trapping water from the vapors evolved by the reaction mixture and the regeneration of used catalyst by the removal of oxy compounds therefrom.

In order more fully to describe the alkylation process of this invention, reference is made to the accompanying figure which is a flow diagram of one embodiment of our alkylation process. An aromatic hydrocarbon, for example, toluene or a toluene fraction derived from catalytic hydroforming is passed through line 10 into a reactor 11 depicted as an autoclave provided with a stirring device 12 and a temperature control jacket 13. A liquid sulfonic acid catalyst, preferably an alkanesulfonic acid catalyst having 1 to 5 carbon atoms, inclusive, in the alkyl group, is passed through lines 14 and 10 into reactor 11. The mixture of aromatic hydrocarbon and sulfonic acid in the reactor are brought to the desired alkylation temperature, which is usually the reflux temperature of the mixture at about atmospheric pressure, by circulating a heating medium such as steam, hot oil or the like through temperature control jacket 13 of reactor 11. An HCS olefin hydrocarbon fraction containing oxy compounds is then introduced into the reactor through line 15, the rate of introduction of the olefin being controlled so that excess temperature rises are not encountered in the reaction zone. Usually a period of about ½ to 1 hour suffices for the introduction of olefin into the reactor. Following the introduction of olefin into the reaction zone the reaction mixture is rapidly stirred and maintained at the desired reaction temperature, usually between about 240 and about 260° F. for a period of time sufficient to effect substantial alkylation, e. g. between about ½ and about 8 hours, preferably between about 2 and about 5 hours. The minimum amount of sulfonic acid catalyst, for example $C_1$–$C_5$ alkanesulfonic acid, present in the reaction zone is sufficient at least to maintain a distinct liquid catalyst phase, for example between about 3 and about 5 weight percent based on the aromatic hydrocarbon fraction. In the course of the alkylation reaction various of the oxy compounds present in the HCS olefin fraction undergo dehydration reactions. The aromatic hydrocarbon feed stock and water produced by the dehydration and otherwise introduced with the reactants form minimum-boiling azeotropic mixtures which pass overhead from the boiling reaction mixture through a jacketed line 16 and condenser 17 into a settler 18 provided with a pressure relief line 19 and a weir 20. Water accumulates as a lower liquid phase in settler 18 and is withdrawn therefrom through valved line 21. The supernatant liquid layer of hydrocarbon flows over weir 20 to the upper part of settler 18 whence it is withdrawn through valved line 22 for recycle to reactor 11 through line 10.

Reaction products are withdrawn from reactor 11 through valved line 23 and cooler 24 into a settler 25 provided with a pressure relief line 26 and a weir 27. By suitable control of cooler 24 the liquid mixture in settler 25 may be maintained between temperatures of about 70 and about 150° F., suitably at about room temperature. In any event the temperature in settler 25 should be sufficiently high to maintain the catalyst phase in the liquid condition. A distinct liquid catalyst layer is withdrawn from the lower portion of settler 25 through valved line 28, whence all or a portion of the catalyst may be recycled through lines 29 and 14 to reactor 11 to be reused. A layer of liquid hydrocarbon reaction products flows over weir 27 and accumulates in the upper portion of settler 25, whence it is withdrawn through valved line 30 and heat exchanger 31 into a washing tower 32.

The hydrocarbon reaction products of the present alkylation process dissolve significant proportions of the sulfonic acid catalyst, the specific proportion depending upon the composition of the hydrocarbon reaction products, the specific sulfonic acid catalyst and the temperature in settler 25. To prevent undue loss of catalyst and excessive corrosion of the hydrocarbon fractionating equipment, it is desirable to remove dissolved catalyst from the hydrocarbon reaction products, for example by washing with water, aqueous alkaline solutions or the like. In general water serves as a suitable washing agent. The washing liquid is introduced into the upper portion of tower 32 through a spray line 33. An aqueous solution of sulfonic acid or sulfonic acid salt forms in the lower portion of tower 32 whence it is withdrawn through valved line 34 and may be rejected from the system through valved line 35.

The alkymer and other hydrocarbon products pass overhead from tower 32 through valved line 36 into a fractionating tower 37, which may be of the usual bubble cap or screen packing design. Unreacted aromatic hydrocarbon is withdrawn through valved line 38 and may be recycled to reactor 11. Low boiling alkylate and unreacted olefinic hydrocarbons and non-olefinic hydrocarbons which were present in the HCS fraction are withdrawn from fractionator 37 through valved line 38A. If the olefin concentration in the effluent of line 38A is sufficiently high it may be desirable to recycle this material (by a line not shown) to reactor 11; otherwise olefins may be segregated from this effluent by conventional methods and the olefins thus concentrated may be employed in further alkylation reactions. The non-olefinic components of the effluent in line 38 may be employed as fuels in jet engines or reciprocating piston engines or may be subjected to further chemical processes such as reforming, cracking, isomerization, alkylation, etc. to produce superior non-olefinic hydrocarbon fuels.

A heart alkymer fraction of the desired boiling range is withdrawn from fractionating tower 37 through valved line 39. This fraction, especially when produced by the alkylation of $C_6$–$C_{10}$ aromatic hydrocarbons with $C_{10}$–$C_{15}$ HCS olefin fractions may be sulfonated with sulfuric acid, $SO_3$ or the like to produce alkyl aromatic sulfonic acids whose alkali metal, ammonium or amine salts are excellent wetting, washing and detergent agents.

High boiling materials such as polyalkylated aromatic hydrocarbons and HCS olefin polymers, boiling above the boiling range of the heart alkymer, are withdrawn from tower 37 through valved line 40.

The heavy alkymer may be reacted with a low boiling aromatic hydrocarbon such as benzene or toluene, to produce further quantities of alkymer boiling in the range of heart alkymer. Suitable reaction may for example be effected at temperatures of about 80 to 100° F. in the presence of about 5 weight percent $AlCl_3$ and a small proportion of HCl. Other Friedel-Crafts type catalysts may be employed in the disproportionation reaction.

With continued use, the sulfonic acid catalyst dissolves a substantial proportion of oxy compounds and some aromatic hydrocarbons from the alkylation charging stocks. The accumulation of these non-acid materials in the acid catalyst phase tends to increase the volume of the catalyst phase, reduces the effective catalyst concentration and impairs the efficiency of the sulfonic acid catalyst. It is desirable, therefore, from time to time, to withdraw used catalysts from settler 25 through valved line 28 and line 41 into a settler 42 provided with a pressure relief line 43 and a weir 44. Water or aqueous sulfonic acid derived from washing tower 32 is passed through valved line 45 into line 41 where it mixes with the used sulfonic acid catalyst. If desired, venturis, knot hole mixers or other mixing devices may be used in line 41 to effect intimate contacting between the used sulfonic acid catalyst and water. The amount of water mixed with the used catalyst should be sufficient to cause the separation of the catalyst into an aqueous sulfonic acid catalyst layer and a layer of water-insoluble oxy compounds and hydrocarbons. The oxy compounds, aromatic hydrocarbons, etc., form a supernatant liquid phase in settler 42, pass over weir 44 and are withdrawn from the settler through valved line 46 into a fractionating tower 47. High boiling oxy compounds are withdrawn from the lower portion of tower 47 through valved line 48. Aromatic hydrocarbon vapors pass overhead through line 49 and may be discharged from the system through valved line 50 or passed through line 51 and condenser 52 through line 10 for recycle to reactor 11.

The aqueous layer of sulfonic acid catalyst which forms in the lower portion of settler 42 is withdrawn through valved line 53, whence all or a portion may be passed through valved line 54 and lines 14 and 10 for recycle to reactor 11. It is preferable, however, to pass all or a major proportion of the aqueous catalyst layer from valved line 53 into line 55, through heat exchanger 56 into a stripping tower 57, where substantial dehydration and the removal of volatile materials from the sulfonic catalyst are effected. It is desirable to introduce into tower 57 an inert substance capable of forming a minimum-boiling azeotrope with water to facilitate the dehydration of the aqueous sulfonic acid catalyst solution. For example, an azeotrope-forming material such as benzene or toluene may be introduced through valved line 58 into line 55 and thence into stripping tower 57. The dehydration of water washings obtained from tower 32 may also be effected by passing these washings through valved lines 34 and 59 into tower 57. Stripped and dehydrated sulfonic acid catalyst is withdrawn from the lower portion of tower 57 through valved line 60 for recycle to reactor 11 through lines 14 and 10. A water azeotrope and other volatile materials are withdrawn from stripping tower 57 through valved line 57A. Water and the azeotrope-forming material may be separated from the effluents of line 57A and the azeotrope-forming materials may be recycled to tower 57 for further use.

It will be appreciated that the accompanying figure merely depicts one of the possible methods of the operation of the alkylation process of our invention. The alkylation process of this invention can be operated batchwise, continuously or semi-continuously. It will be appreciated that our process is not restricted to the use of a stirring autoclave and that other conventional alkylation equipment such as coil or tower reactors such as are employed in petroleum refinery alkylation operations may be employed in the process of this invention.

Having thus described our invention, what we claim is:

1. An alkylation process which comprises contacting a monocyclic aromatic hydrocarbon containing 6 to 10 carbon atoms, inclusive, in the molecule in an alkylation zone with an olefinic hydrocarbon fraction containing 7 to 16 carbon atoms, inclusive, in the molecule, said olefinic hydrocarbon fraction comprising a substantial amount of preferentially oil-soluble, neutral oxygenated organic compounds including compounds containing a carbonyl group, at least some of said compounds undergoing dehydration under the alkylation reaction conditions, effecting said contacting in the presence of a liquid alkanesulfonic acid catalyst in a quantity sufficient to form a distinct liquid phase, at a temperature between about 230° F. and about 300° F., and withdrawing water as a vapor from said alkylation zone at a rate sufficient to preclude the accumulation of water in said zone in an amount in excess of about 5 percent by weight, based on said alkanesulfonic acid catalyst.

2. The process of claim 1 wherein said alkanesulfonic acid contains 1 to 5 carbon atoms, inclusive, in the molecule.

3. The process of claim 2 wherein the olefinic hydrocarbon fraction contains 10 to 15 carbon atoms, inclusive, in the molecule.

4. An alkylation process which comprises contacting an alkylatable aromatic hydrocarbon in an alkylation zone with an olefinic hydrocarbon fraction comprising a substantial amount of preferentially oil-soluble, neutral oxygenated organic compounds including compounds containing a carbonyl group, at least some of said compounds undergoing dehydration under the alkylation reaction conditions, effecting said contacting in the presence of a liquid sulfonic acid catalyst in a quantity sufficient to form a distinct liquid phase at a temperature between about 230° F. and about 300° F. for a period of time sufficient to effect substantial alkylation, withdrawing water as a vapor from said alkylation zone at a rate sufficient to preclude the substantial accumulation of water in said alkylation zone, cooling at least a portion of the alklation reaction mixture to effect separation thereof into a liquid phase comprising essentially alkylated aromatic hydrocarbons and a second liquid phase comprising essentially said sulfonic acid catalyst and oxygenated organic compounds extracted by said catalyst from said olefinic hydrocarbon fraction, separating said second liquid phase, diluting said second liquid phase with water in quantity sufficient to effect separation thereof into two immiscible liquid phases, viz., a liquid phase consisting essentially of aqueous sulfonic acid and a liquid phase comprising essentially oxygenated organic compounds, and recycling sulfonic acid catalyst from said liquid phase consisting essentially of aqueous sulfonic acid to said alkylation zone.

5. The process of claim 4 wherein the alkylatable aromatic hydrocarbon is a monocyclic aromatic hydrocarbon containing 6 to 10 carbon atoms, inclusive, in the molecule, said olefinic hydrocarbon fraction contains 7 to 16 carbon atoms, inclusive, in the molecule and said liquid sulfonic acid is an alkanesulfonic acid.

6. A process for the alkylation of benzene which comprises contacting benzene in an alkylation zone with an olefinic hydrocarbon fraction containing 7 to 16 carbon atoms, inclusive, in the molecule, said olefinic hydrocarbon fraction comprising at least about 5 to 30 percent by weight of preferentially oil-soluble, neutral oxygenated organic compounds including compounds containing a carbonyl group, at least some of said compounds undergoing dehydration under the alkylation reaction conditions, maintaining a molar ratio of benzene to said olefinic hydrocarbon between about 0.7 and about 1.5, effecting said contacting in the presence of an alkanesulfonic acid having 1 to 5 carbon atoms, inclusive, in the molecule in quantity sufficient to form a distinct liquid phase at a temperature between about 230° F. and about 260° F., and withdrawing water as a vapor from said alkylation zone at a rate sufficient to preclude the accumulation of water in said alkylation zone in an amount in excess of about 5 percent by weight, based on said alkanesulfonic acid catalyst.

7. An alkylation process which comprises contacting an alkylatable aromatic hydrocarbon in an alkylation zone with an olefinic hydrocarbon fraction comprising from about 5 to 30 percent by weight of preferentially oil-soluble, neutral oxygenated organic compounds including compounds containing a carbonyl group, at least some of said compounds undergoing dehydration under the alkylation reaction conditions, effecting said contacting in the presence of a liquid sulfonic acid catalyst in a quantity sufficient to form a distinct liquid phase at a temperature between about 230° F. and about 300° F. for a period of time sufficient to effect substantial alkylation, withdrawing water as a vapor from said alkylation zone at a rate sufficient to preclude the substantial accumulation of water in said alkylation zone, cooling at least a portion of the alkylation reaction mixture to effect separation thereof into a liquid phase comprising essentially alkylated aromatic hydrocarbons and a second liquid phase comprising essentially said sulfonic acid catalyst, unconverted aromatic hydrocarbon and oxygenated organic compounds extracted by said catalyst from said olefinic hydrocarbon fraction, separating said second liquid phase, diluting said second liquid phase with water in quantity sufficient to effect separation thereof into two immiscible liquid phases, viz., a liquid phase consisting essentially of aqueous sulfonic acid and a liquid phase comprising essentially a mixture of oxygenated organic compounds and unconverted aromatic hydrocarbon, fractionally distilling said unconverted aromatic hydrocarbon from said mixture and recycling aromatic hydrocarbon thus recovered to said alkylation zone, and recycling sulfonic acid catalyst from said liquid phase consisting essentially of aqueous sulfonic acid to said alkylation zone.

8. An alkylation process which comprises contacting an olefinic hydrocarbon fraction comprising from about 5 to 30 percent by weight of preferentially oil-soluble, neutral oxygenated organic compounds including compounds containing a carbonyl group, with a molar excess of an alkylatable monocyclic aromatic hydrocarbon having from six to ten carbon atoms per molecule, effecting said contact in the presence of a liquid alkanesulfonic acid catalyst present in sufficient quantity to form a distinct liquid phase and at a temperature between about 230° F. and about 300° F. for a period of time sufficient to effect substantial alkylation, distilling monocyclic aromatic hydrocarbons and water, that is formed during alkylation by dehydration of some of the oxygenated compounds, from said alkylation zone at a rate sufficient to preclude the substantial accumulation of water in said alkylation zone, condensing effluent water vapor and aromatic hydrocarbons, separating the aromatic hydrocarbons from the said water, returning the aromatic hydrocarbon to the alkylation zone, withdrawing alkylation reaction mixture from the said zone, cooling at least a portion of the said alkylation reaction mixture, and separating the same into a liquid phase comprising essentially alkylated aromatic hydrocarbons and a second liquid phase comprising essentially said sulfonic acid catalyst, unconverted aromatic hydrocarbon and oxygenated organic compounds.

CHESTER E. ADAMS.
WAYNE A. PROELL.
EDWARD G. BALLWEBER.

REFERENCES CITED

The following references are of record in the file of this patent:

UNITED STATES PATENTS

| Number | Name | Date |
|---|---|---|
| 1,908,190 | Schollkopf | May 9, 1933 |
| 2,014,766 | Isham | Sept. 17, 1935 |
| 2,244,512 | Brandt | June 3, 1941 |
| 2,409,802 | Schmerling | Oct. 22, 1946 |
| 2,425,572 | Slotterbeck | Aug. 12, 1947 |
| 2,429,622 | Hirsch | Oct. 28, 1947 |
| 2,437,356 | Hill | Mar. 9, 1948 |
| 2,462,793 | Lee | Feb. 22, 1949 |
| 2,465,049 | Wolk | Mar. 22, 1949 |